UNITED STATES PATENT OFFICE.

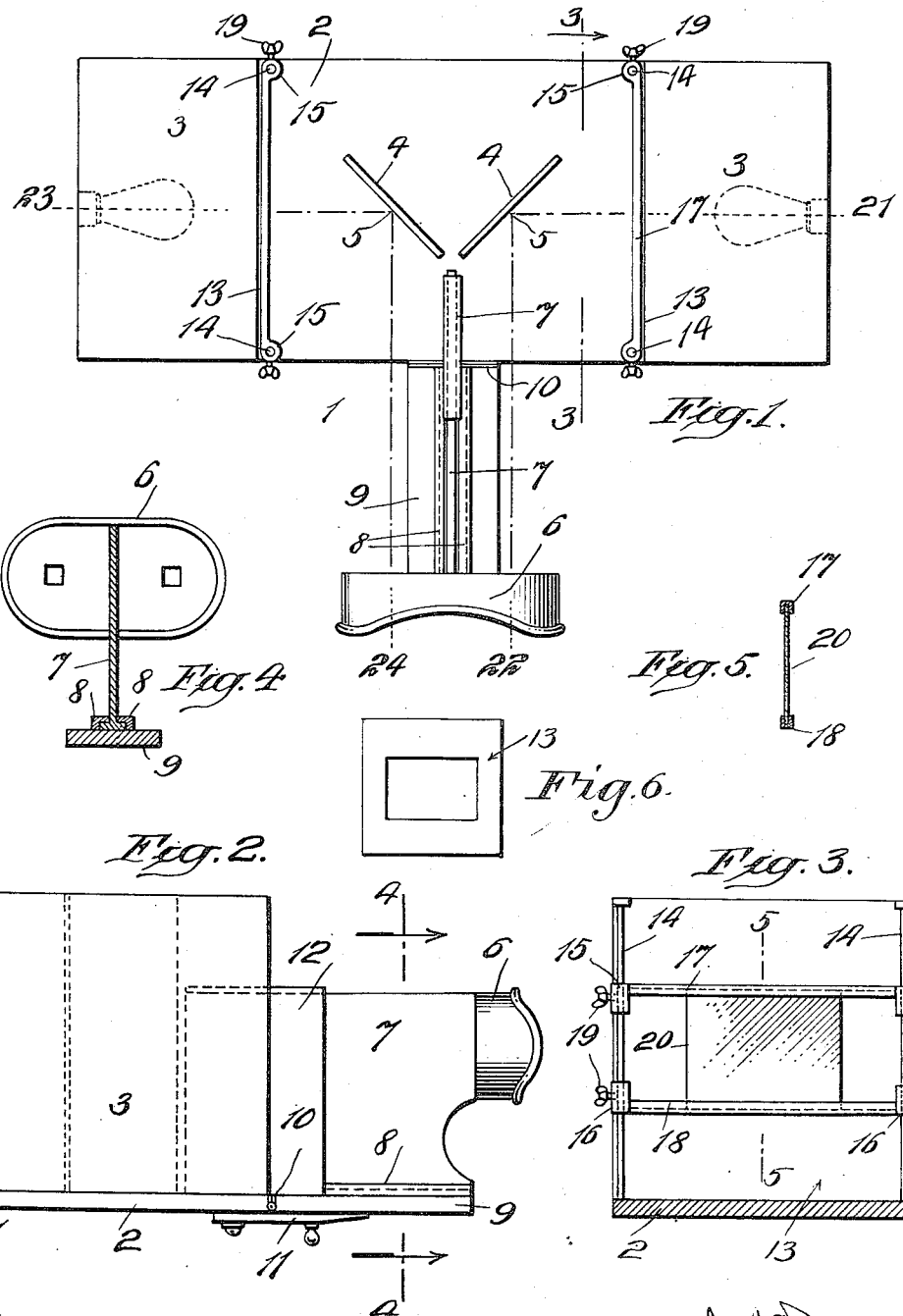

HARRY F. WAITE, OF NEW YORK, N. Y.

STEREOSCOPE FOR X-RAY PLATES.

1,373,847.   Specification of Letters Patent.   Patented Apr. 5, 1921.

Application filed July 14, 1919. Serial No. 310,780.

*To all whom it may concern:*

Be it known that I, HARRY F. WAITE, a citizen of the United States, and a resident of Whitestone Landing, city of New York, county of Queens, and State of New York, have invented a new and useful Improvement in Stereoscopes for X-Ray Plates, of which the following is a specification.

Heretofore instruments of this character have been made in which the plate holders have been placed on each side of two mirrors set at substantially ninety degrees to each other and at forty-five degrees to the plates under observation, and the lanterns holding these plates have been shifted either toward or away from the mirrors so as to keep them in proper focus, and the observer has raised or lowered his head or moved to one side or the other until he got his eyes in focus and obtained the stereoscopic effect. When plates were used which were smaller than the capacity of the lanterns, two curtains, shifted at right angles, were employed and the plates were put in corresponding corners. Such stereoscopes are hard to adjust and hard to use because it is difficult for the observer to hold the position wherein he obtains the stereoscopic effect.

The object of my invention is to overcome these difficulties entirely and to make a compact, simple and reliable apparatus which can be used with absolute certainty so that the observer will instinctively place his eyes in the proper position to obtain the stereoscopic effect and thereby greatly facilitate the use of the apparatus.

This and other objects are accomplished by my invention, one embodiment of which is hereinafter more particularly set forth.

For a more particular description of my invention, reference is to be had to the accompanying drawings, in which—

Figure 1 is a plan view of my improved apparatus.

Fig. 2 is an end elevation of the same.

Fig. 3 is a sectional view, taken on the line 3—3 of Fig. 1, looking in the direction of the arrows.

Fig. 4 is a sectional view, taken on the line 4—4 of Fig. 2, looking in the direction of the arrows.

Fig. 5 is a sectional view, taken on the line 5—5 of Fig. 3, looking in the direction of the arrows.

Fig. 6 shows a diaphragm.

Throughout the various views of the drawings, similar reference characters designate similar parts.

My improved stereoscope 1 has a base 2 on which are fixedly mounted two lanterns 3, one at each end which are so arranged and disposed that they illuminate their respective plates with an even illumination, and these plates are put on the interior faces of these lanterns and near the mirrors 4, which are preferably made so as to stand at right angles to each other and at forty-five degrees to the planes of the plates, as shown in Fig. 1, and with their optical centers 5 in the median plane of the lanterns 3. There is also a head-piece 6 which corresponds in outline and function to the corresponding head-piece of a household stereoscope, except that it has no lenses and it is mounted on a partition 7 which has an enlarged lower end which slides in suitable guides 8 fixed to the support 9 which is hinged at 10 to the base 2 and separated at the hinge by an ordinary button 11 or in any other suitable manner. The partition 7 slides in a housing 12, which is divided into two parts above the hinge 10, and this housing serves to form with the partition 7 a telescopic division plate which keeps the right eye of the observer from seeing the left mirror, and the left eye from seeing the right mirror, when the apparatus is in use.

In the foregoing has been described an apparatus which is suitable for plates of the maximum capacity of the apparatus, say fourteen by seventeen inches. Ordinarily the plates which will be examined will be much smaller than this and so special provision has to be made for them in the apparatus. This provision is made as follows. Each lantern 3 is provided with a diaphragm 13 with a central opening of the exact area and shape of the plate to be examined so that the size of the opening of the lantern is reduced to the proper size for the plate. At each side of each diaphragm and adjacent to the front of each lantern and close thereto is a post 14 on which are mounted two bushings 15 and 16, an upper and a lower. The bushings 15 are united by a U-trough 17 and the bushings 16 by a corresponding trough 18, and these troughs are held in any desired position by means of set screws 19 which pass through the bushings. As shown in Figs. 3 and 5, a plate 20 may be placed and held between the troughs 17 and 18 and at any desired level so that the center of the plate is over the center of the opening in the diaphragm.

In the foregoing, it has been assumed that the points 5 and mirrors 4 are separated a distance corresponding to the width of the eyes of the observer and that the optical axes of the instrument may be represented by the lines 21—5—22 and 23—5—24 respectively, so that when the apparatus is in use and the lanterns are illuminated and the plate 20 in proper position, as above described, the head-piece 6 is moved toward or away from the base 2 until the points of observation along the optical axes are distanced from the plates substantially the same as the distances of the plates when the exposures were made from the anode of the X-ray tube. As this is generally known, it is easy to set the head-piece accurately in advance, and then the observer, after putting the plates 20 in the manner described above, can easily observe this and obtain the stereoscopic effect immediately and unhesitatingly, and he does this in a compact apparatus where the lanterns remain at a fixed location with regard to the base 2. The purpose of providing the hinge 10 is to enable the headpiece to be swung out of the way when the apparatus is not in use. If desired, this hinge may be omitted, and then the support 9 will remain rigid with the base 2 whether the apparatus is in use or not.

While I have shown and described one embodiment of my invention, it is obviously not restricted thereto, but is broad enough to cover all structures that come within the scope of the annexed claims.

Having thus described my invention, what I claim is:

1. A stereoscope for X-ray plates of different sizes which consists of a base with lanterns fixed thereto and supported thereon and provided with adjustable means adapted to receive plates and support them in the same optical axis, mirrors fixed to said base between said lanterns and a head piece adjustably connected to the base so that its position may be adjusted according to the nature of the plates and the needs of the observer.

2. A stereoscope for X-ray plates of different sizes composed of a base with lanterns mounted thereon in fixed relation, two mirrors and a head piece connected to said base, diaphragms open at the centers for reducing the size of the openings for the plates and means for supporting the respective plates in positions corresponding with the diaphragms so that the different sized plates may be used with the apparatus and all plates will have their centers in the optical axis of the instrument.

3. A stereoscope for X-ray plates provided with lanterns, posts arising adjacent to said lanterns, troughs and means for connecting the same to said posts so that the troughs may be mounted at any desired elevation and hold a plate between them and means for determining the position from which the plates should be viewed.

4. A stereoscope for X-ray plates of different sizes provided with a base, lanterns fixed to said base, two mirrors supported by said base and adjacent to said lanterns, means for supporting plates in the optical axis of the instrument, a support pivoted to said base and a headpiece slidably mounted on said support so that the apparatus may be used for plates of different exposures with proper adjustments for each.

5. A stereoscope for X-ray plates provided with a base having a lateral extension, lanterns and mirrors in fixed relation to said base, the mirrors being placed between the lanterns, means for supporting plates in the optical axis of the instrument, and a headpiece adjustably mounted on said extension and in front of said mirrors so that they may be viewed from it.

6. A stereoscope for X-ray plates provided with a base having a lateral extension, lanterns and mirrors in fixed relation to said base, the mirrors being placed between the lanterns, means for supporting plates in the optical axis of the instrument, a headpiece adjustably mounted on said extension and in front of said mirrors so that they may be viewed from it, diaphragms in front of said lanterns with centrally located openings corresponding to the plates viewed from the headpiece and through the mirrors and means for holding the plates in proper position before said openings.

HARRY F. WAITE.